United States Patent [19]

Smith

[11] Patent Number: 5,491,022
[45] Date of Patent: Feb. 13, 1996

[54] PROTECTIVE FABRICS AND GARMENTS

[75] Inventor: W. Novis Smith, Philadephia, Pa.

[73] Assignee: Lakeland Industries, Inc., Ronkonkoma, N.Y.

[21] Appl. No.: 125,771

[22] Filed: Sep. 24, 1993

[51] Int. Cl.⁶ .......................... B32B 27/06; B32B 27/34; B32B 27/32; B32B 27/36
[52] U.S. Cl. .......................... 428/224; 428/284; 428/286; 428/287; 428/474.4; 428/475.5; 428/476.3; 428/480; 428/481; 428/500; 428/515; 428/526; 428/528
[58] Field of Search .................................... 428/224, 284, 428/286, 287, 475.5, 475.8, 476.3, 474.4, 480, 481, 500, 515, 526, 528

[56] References Cited

U.S. PATENT DOCUMENTS

| | | | |
|---|---|---|---|
| 4,448,841 | 5/1984 | Glass et al. | 428/270 |
| 4,533,592 | 8/1985 | Bingham | 428/213 |
| 4,992,331 | 2/1991 | DeCoste, Jr. | 428/354 |
| 5,336,549 | 8/1994 | Nishimoto et al. | 428/213 |

*Primary Examiner*—W. Robinson Clark
*Attorney, Agent, or Firm*—John Lezdey

[57] ABSTRACT

A fire and chemical resistant fabric having anti-static properties which comprises at least one laminate formed by coextruding a pair of polymeric sheets with an intermediate layer of a polar resin or hydrophilic polymer which is adhered to a fabric scrim comprising a blend of polyester and cellulosic fibers, the fabric scrim containing an effective amount of an anti-static and fire resistant agent.

11 Claims, 1 Drawing Sheet

PROTECTIVE FABRICS AND GARMENTS

FIELD OF THE INVENTION

The present invention relates to fabrics which have anti-static characteristics, provide a barrier against chemicals and are also self-extinguishing in fires. More particularly, there is provided a fabric for use in the preparation of light weight protective garments.

BACKGROUND OF THE INVENTION

Protective clothing of many types is now well known for many and varied uses, such as suits for industrial workers, suits for fireman, forest fire fighters, race car drivers and airplane pilots, and suits for use by military personnel, for protection from fire, vapors and harmful substances. Garments include not only complete, hermetic suits, but also individual garments such as trousers, jackets, gloves, boots, hats, head coverings, masks, etc.

Regulations restricting exposure to hazardous environments of various kinds, such as the Occupational Safety and Health Act, make it increasingly necessary to have better and more effective kinds of protective garments. In particular, certain requirements by the U.S. Coast Guard and related requirements by other U.S. government or organizations involve a total protective hermetic suit or envelope around the individual person or fireman. These situations involve cleaning up chemical spills or for fighting chemical fires where the chemical materials are unknown and presumed toxic.

The need for such encapsulating suits for "immediately dangerous to life and health (IDLH)" environments. These suits must be air tight and worn with a self-contained breathing apparatus. (These are termed Level A suits under OSHA/EPA guidelines.) The suit must be nonabsorbent, totally impermeable, and resistant to the widest range of chemicals and reagents in liquid and gaseous forms. It should also be as fire resistant and anti-static as possible. Since these suits are being worn by actively working individuals, they should also be flexible, abrasion resistant, light weight, and should maintain their impermeability while being used.

Such garments presently available are almost invariably of thick construction and heavy in weight, and are often fabricated at least in part from materials impermeable to water or water vapor, such as natural and synthetic rubbers and elastomers, chlorinated rubbers, etc.

Protective clothing comprised of laminates of films have the problem of forming "kinks" when bent so as to restrict movement and become cumbersome. Moreover, some of the protective clothing are porous and provide little protection against hazardous chemical vapors.

Besides the hazards from toxic vapors and fire, being in an atmosphere of highly flammable fumes can present a risk if static charges are generated and build up. Consequently, consideration must be given to provide a protective garment with anti-static properties.

The Gore et al. U.S. Pat. No. 4,194,041 describes a waterproof laminate comprising an outer layer of a hydrophobic material and an inner layer which permits the transfer of moisture vapor. Textile layers can be added for strength and aesthetic characteristics. The textile layers are on the outside of the laminate of the textile layers and the hydrophobic and moisture-vapor permeable layers.

The Falcone U.S. Pat. No. 3,513,057 describes a process for bonding textile fibers to elastomeric ethylene/-higher alpha-olefin copolymers.

The Hansen U.S. Pat. No. 3,809,077 discloses a surgical drape constructed of two layers of thin absorbent compacted webs of randomly interlaced staple textile fibers having disposed therebetween a thin drapable impervious sheet of a thermoplastic film which is adherently bonded to the absorbent sheets across the contacting surfaces thereof by means of a soft latex adhesive.

Ross in U.S. Pat. No. 3,695,967 describes a laminated material having fibrous surfaces made by laminating a nonwoven fibrous layer/thermoplastic film/nonwoven fibrous layer assembly. Lamination of the assembly is accomplished by pressing it with at least one surface which has a multiplicity of closely spaced raised areas while heating the assembly so that at least a portion of the thermoplastic film is raised to a temperature above its softening point.

None of the prior art patents disclose the use of an intermediate fabric which provides anti-static and fire resistant characteristics to the fabric.

Conventional methods of providing an anti-static property to a laminated fabric is to coat the surface with an anti-static agent or to add the anti-static agent into the plastic layer at the time of extrusion. However, surface coatings can be lost by abrasion or by contact with fluids. Furthermore, anti-static agents which are suitable for inclusion into plastics for coextrusion are not fire resistant.

SUMMARY OF THE INVENTION

In accordance with the present invention there is provided a chemical resistant and fire resistant fabric having anti-static properties. The fabric comprises at least one layer of a plastic laminate formed by coextruding at least two layers of polymeric sheets with an intermediate layer of a polar resin or a hydrophilic polymer and adhering the combined layer to a fabric scrim comprising a blend of polyester and cellulosic fibers which has been treated with a fire resistant and anti-static agent.

Depending upon the utility, one or both surfaces of the fabric scrim can be bonded with the plastic laminate.

The fabric can be utilized to prepare protective garments, covers, and the like.

Therefore, it is an object of the invention to provide a fire resistant fabric having anti-static characteristics which can be used to prepare protective garments.

It is a further object of the invention to provide a disposable protective garment which has anti-static characteristics.

It is a further object of the invention to provide a fabric which can be manufactured into a garment having seams formed by fusion bonding.

Other objects and advantages will be seen by reference to the drawing and the description of the preferred embodiments.

Figure 1:
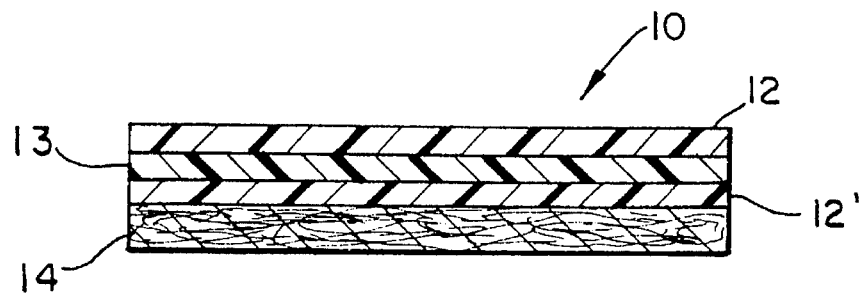
FIG. 1 is a cross-sectional view of a fabric according to the invention.

Referring first to FIG. 1, one preferred embodiment of the invention is shown wherein a fabric 10 comprises a laminate of coextruded sheets 12, 13, 12' which is adhered to a scrim fabric 14 by use of an adhesive or by fusion bonding.

Layers 12 and 12' can comprise fusible polymeric materials, for example, polyolefin (polyethylene, polypropylene, etc.) polyester (polyethylene terephthalate), polyamide, and the like. Preferable is low density polyethylene because it is capable of readily providing weld seals. The coextruded sheets which form the laminate are of a thickness of about 0.5 to 3 mils each.

The intermediate layer 13 is preferably a polymeric material having good chemical blocking ability that is free of pin holes. Suitable polymers include nylon, ionomers, ethylene vinyl alcohol (EVOH), polyvinyl acetate (PVAC), polyvinyl alcohol (PVOH), and the like.

The fabric scrim 14 can be woven or nonwoven. Cellulose containing fabrics or cellulose fabric blends are advantageous because of their ability to retain the fire resistant and anti-static agents as well as being useful to absorb perspiration. Preferred are the nonwoven fabrics comprising about 30 to 50% by weight of polyester and about 70 to 50% by weight of cellulosic fibers. The cellulosic fibers which are especially useful are cotton, rayon, wood fibers, mixtures thereof, and the like. The preferred polyester is pollyethylene terephthalate. A preferred fabric scrim is sold under the trademark PYROLON by Johnson and Johnson, Inc., New Brunswick, N.J. PYROLON comprises about 60% wood fibers and about 40% polyester. PYROLON has a density of about 2.68 oz/yd$^2$ and is of a thickness of about ⅛ to ¼ inch.

Figure 2:
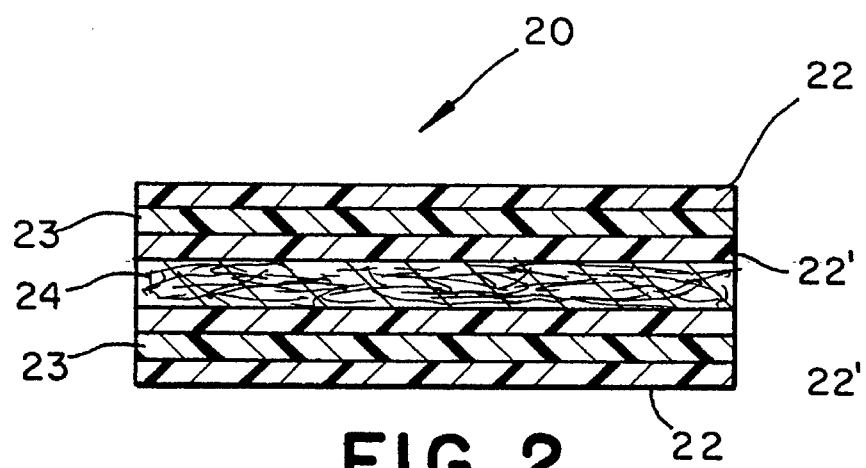
FIG. 2 is a cross-sectional view of another fabric of the invention.

As shown in FIG. 2, the fabric 20 of the present invention can comprise a fire resistant and anti-static fabric scrim 24 which is bonded on both sides to laminates comprising a coextrusion of a polar resin or hydrophilic polymer 23 between a pair of polymeric sheets 22, 22'.

Figure 3:
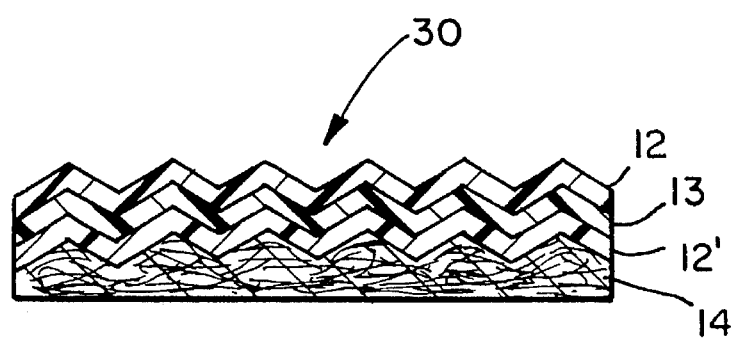
FIG. 3 illustrates the fabric of the invention wherein the laminate is creped.

Embossing or creping the outer laminate or a layer of the outer laminate as shown in FIG. 3 produces a fabric 30 which has improved flexibility and stretchability so as to give greater freedom to the wear of a garment made from the fabric 30.

The fire resistant and anti-static agents which are added onto the fabric scrim in an amount of about 6 to 20% by weight are preferably inorganic such as ammonium polyphosphate and ammonium dihydrogen phosphate.

The anti-static nature of the garments and fabrics of the invention can be further achieved through the use of corona discharge to the outer surface of the plastic or polymer or by incorporating an anti-static chemical into the outer most layer of the multilayered extruded portion. Fire retarding chemicals can be added to the plastic film including aluminum and trihydrate, antimony oxide, organohalogen compounds, organophosphorus compounds.

Preferred antistatic agents include aluminum oxide, stearates such as aluminum stearate or mixtures thereof. Liquid anti-static agents include many of the commonly-employed nonionic and anionic surfactants. However, cationic amine surfactants such as quaternary or tertiary amines are particularly effective as anti-static agents in the present composition.

Cationic amines useful in the present invention include the N-(higher) $C_{14}$–$C_{24}$-alkyl-N-benzyl-quaternary ammonium salts which comprise water solubilizing anions such as halide, e.g., chloride, bromide and iodide; sulfate, methylsulfate and the like and the heterocyclic imide such as the imidazolinium salts.

For convenience, the aliphatic quaternary ammonium salts may be structurally defined as follows:

$$(R)(R_1)(R_2)(R_3)N^+X^-$$

wherein R is benzyl, or lower(alkyl) benzyl; $R_1$ is alkyl of 10 to 24, preferably 12 to 22 carbon atoms; $R_2$ is $C_{10}$–$C_{24}$-alkyl or $C_1$–$C_4$-alkyl, $R_3$ is lower alkyl of 1 to 4 carbon atoms and X represents an anion capable of imparting water solubility or dispersibility including the aforementioned chloride, bromide, iodide, sulfate and methosulfate. Particularly preferred species of these aliphatic quaternary salts include $nC_{12}$–$C_{18}$-alkyldimethylbenzylammonium chloride (myrisaikonium chloride), n-$C_{12}$–$C_{14}$-alkyldimethyl(ethylbenzyl) ammonium chloride (quaternium 14), dimethyl(benzyl)ammonium chloride and mixtures thereof. These compounds are commercially available as the BTC series from Onyx Chemical Co., Jersey City, N.J. For example, BTC 2125M is a mixture of myrisalkonium chloride and quaternium-14.

Other useful aliphatic quaternary ammonium salts include the N,N-di-(higher)-$C_{10}$–$C_{24}$-alkyl-N,N-di(lower)-$C_1$–$C_4$-alkyl-quaternary ammonium salts such as distearyl(dimethyl)ammonium chloride, dihydrogenated tallow(dimethyl)ammonium chloride, di-tallow(dimethyl)ammonium chloride, distearyl(dimethyl) ammonium methylsulfate, and di-hydrogenated-tallow(dimethyl)ammonium.

A halogen-containing organic flame retarder and an auxiliary flame-retarding agent may also be added to provide the outer films with improved resistance to burning. Specific examples of halogen-containing organic flame retarder include chlorinated paraffins, tetrabromobisphenol-A and oligomers thereof, decabromobiphenyl ethers, hexabromobiphenyl ethers, pentabromobiphenyl ethers, pentabromotoluene, pentabromoethylbenzene, hexabromobenzene, pentabromophenol, tribromophenol derivatives, perchloropentanecylcodecane, hexabromocyclododecane, tris(2,3 dibromopropyl-1)-isocyanurate, tetrabromobisphenol-S and derivatives thereof, 1,2-bis(2,3,4,5,6-pentabromophenoxy)ethane, 1,2-bis(2,4,6-tribromophenoxy)ethane, brominatedstyreneoligomers, 2,2-bis-(4(2,3-dibromopropyl)-3,5-dibromophenoxy)propane, tetrachlorophthalic anhydride and tetrabromophthalic anhydride.

The auxiliary flame-retarding agents which may be used in the resin composition of the invention include antimony trioxide, sodium antimonate, zinc borate, and oxides and sulfides of zirconium and molybdenum, the most favorable result being obtained by the use of antimony trioxide.

The amount of the halogen-containing organic flame retarder added to the resin composition varies depending on the required degree of flame resistant property, and ranges generally from 2 to 35 wt %, preferably from 5 to 25 wt %.

The added amount of the auxiliary flame-retarding agent may be within 0.4 to 21 wt % and the ratio thereof to the halogen-containing organic flame retarder should be within the range of from 6/10 to 2/10, preferably from 5/10 to 3/10.

The present invention is further illustrated by the following examples, but is not to be limited thereby. The amounts shown are all in percent by weight.

EXAMPLE 1

A laminating coextruded film material was prepared using an inner layer of ethylene/vinyl alcohol (EVOH) and two outer layers of polyethylene by know coextrusion means. The film is then fed from a roller and laid on top of a web of PYROLON containing 10% by weight of ammonium polyphosphate and passed through a fusion unit with rollers.

The polyethylene had a softening range of 110°–125° C. and a melting point of about 132°. The laminating film had a thickness of about 3 mils.

The film and the web of PYROLON were laminated together with a hot press at about 135° C. A minimal compression was applied in order to maintain the bulk of the PYROLON. The result was a soft drapable fabric which could be used to prepare a protective garment.

In lieu of hot pressing, a fire proof adhesive may be utilized to bond the PYROLON to the laminating material.

EXAMPLE 2

Following the procedure of Example 1, a fabric was prepared having a tricomponent coextruded laminating film on each side comprising outer sheets of 0.5 mil low density polyethylene and an inner layer of 0.5 mil ethylene/ethylvinyl alcohol (EVOH).

The laminating film and the PYROLON web were laminated together using a hot press at about 145° C.

EXAMPLE 3

Triboelectric (static) Charge Generation.

Following the procedure of ASTMF 2320.05 the fabric of Example 2 was cut into samples and tested for anti-static characteristics. The results were as follows:

| | Static Charge (volts) | | | | |
|---|---|---|---|---|---|
| | Sample 1 | Sample 2 | Sample 3 | Sample 4 | Sample 5 |
| Peak | −130 | 490 | 640 | 80 | −630 |
| 0.5 | <50 | <50 | <50 | <50 | <50 |
| 1.0 | <50 | <50 | <50 | <50 | <50 |
| 2.0 | <50 | <50 | <50 | <50 | <50 |
| 3.0 | <50 | <50 | <50 | <50 | <50 |
| 4.0 | <50 | <50 | <50 | <50 | <50 |
| 5.0 | <50 | <50 | <50 | <50 | <50 |

What is claimed:

1. A fire and chemical resistant fabric having anti-static properties which comprises at least one laminate formed by coextruding a pair of polymeric sheets selected from the group consisting of polyolefin, polyester and polyamide with an intermediate layer of a polar resin or hydrophilic polymer selected from the group consisting of ethylene-vinyl alcohol, polyvinyl alcohol, polyvinyl acetate, ionomers and nylon, said laminate being adhered to a fabric scrim comprising a blend of polyester and cellulosic fibers, said fabric scrim containing an effective amount of an antistatic and fire resistant agent.

2. The fabric of claim 1 wherein said fabric scrim contains about 6 to 20% by weight of said anti-static and fire resistant agent.

3. The fabric of claim 2 wherein said antistatic and fire resistant agent is selected from the group consisting of ammonium polyphosphate and ammoniums, dihydrogen phosphate.

4. The fabric of claim 1 wherein said fabric scrim comprises about 30 to 50% by weight of polyester and about 70 to 50% by weight of cellulosic fibers.

5. The fabric of claim 4 wherein said cellulosic fibers are selected from the group consisting of cotton, rayon and wood.

6. The fabric of claim 4 wherein said fabric scrim is non-woven.

7. The fabric of claim 1 wherein said polymeric sheets have been treated by corona discharge.

8. The fabric of claim 1 wherein said laminate is creped or embossed.

9. A protective garment comprising the fabric of claim 1.

10. A protective garment comprising the fabric of claim 4.

11. A protective garment comprising the fabric of claim 8.

* * * * *